(12) United States Patent
Chen (10) Patent No.: US 7,407,282 B1
(45) Date of Patent: Aug. 5, 2008

(54) EYEGLASS TEMPLE ASSEMBLY

(75) Inventor: Chun-Nan Chen, Tainan (TW)

(73) Assignee: BOR JYE Enterprise Co., Ltd., Tainan (TW)

( * ) Notice: Subject to any disclaimer, the term of this patent is extended or adjusted under 35 U.S.C. 154(b) by 0 days.

(21) Appl. No.: 11/857,475

(22) Filed: Sep. 19, 2007

(51) Int. Cl.
  *G02C 5/14* (2006.01)
(52) U.S. Cl. .......................... 351/118; 351/63; 351/119; 351/120
(58) Field of Classification Search ................. 351/119, 351/118, 120, 63, 111, 153, 41, 158; 16/228
See application file for complete search history.

(56) References Cited

U.S. PATENT DOCUMENTS 4,367,929 A * 1/1983 Fortini .......................... 351/119
5,289,592 A * 3/1994 Paivarinta ....................... 2/431
5,760,867 A * 6/1998 Pernicka et al. ............. 351/120
6,776,483 B1 * 8/2004 Wu ............................. 351/120

* cited by examiner

*Primary Examiner*—Hung X Dang
(74) *Attorney, Agent, or Firm*—Alan Kamrath; Kamrath & Associates PA (57) ABSTRACT

An eyeglass temple assembly has a main body combined with a foam earplug at an outer end. A moving element connected to an inner end of the main body has one end being provided with an annual toothed portion having an engaging segment therein. A connecting element connected to an eyeglass frame has one end provided with an annual toothed plate with a through hole so as to correspondingly and pivotally connect to the moving element. Curved grooves are provided along a perimeter between the through hole and the annual toothed plate on the connecting element so as to provide flexibility for the engaging segment of the connecting element to pass through the through hole of the connecting element. Whereby the eyeglass temple assembly can be used in combination with eyeglasses with functional lenses, so as to facilitate position adjustment of the eyeglasses by moving the eyeglasses up and down.

6 Claims, 8 Drawing Sheets

EYEGLASS TEMPLE ASSEMBLY

FIELD OF THE INVENTION

The present invention relates to an eyeglass temple assembly; particularly, the present invention relates to eyeglass temples connected to protective eyewear having devices for protecting ears such that when the eyewear is worn, earplugs connected at ends of the temples can be directly plugged into a user's ears for protection, and the position thereof may be adjusted accordingly.

BACKGROUND OF THE INVENTION

A variety of eyewear assemblies adopted to protect eyes in the conventional art are usually configured to have respective temples connected at a frame combined with functional lenses, such as eye-protective sunglasses used for welding purpose. When being worn, the temples are placed upon the user's ears so as to provide safety to a user at work. However, after a period of working, the user usually needs to take off the eyewear from time to time. Then, the protective eyewear is put back again to allow the user to continue working, which is inconvenient for the user. On the other hand, for users working in a noisy environment, earplugs are usually plugged into ears for protection so as to prevent injury caused during long working hours.

SUMMARY OF THE INVENTION

The present invention is to provide an alternate design for protective eyewear assembly. The eyewear assembly of the present invention can prevent work injury by directly providing a foam earplug at temples. Once being plugged into a user's ears, the protective eyewear is stably worn so as to provide double protection for the user's eyes and ears. The user also can easily operate the eyeglasses to move them up and down and stably position the eyeglasses as needed.

One object of the present invention is to provide the foam earplug at one end of a main body of the eyeglass temple, with the other end of the main body being inserted into one end of a moving element. The other end of the moving element is provided with an annual toothed portion having an engaging segment therein, so as to correspondingly and pivotally connect to one end of a connecting element of an eyeglass frame, wherein the end of the connecting element has an annual toothed plate with a through hole. At least one curved groove is provided along a perimeter between the through hole and the annual toothed plate on the connecting element so as to provide flexibility for the engaging segment of the connecting element to pass through the through hole of the connecting element. The eyeglass temple assembly of the present invention can be used in combination with eyeglasses provided with functional lenses so as to provide double protection for the user's eyes and ears. Additionally, the eyeglass temple assembly of the present invention facilitates position adjustment of the eyeglasses as needed by moving the eyeglasses up and down.

Another object of the present invention is to provide a moving element with a lateral groove at one side thereof for positional guidance to correspondingly engage with a protrusion of the main body at one side thereof. A plurality of slots is formed on the bottom of the moving element with intervals so as to correspondingly restrict movement of a boundary portion extending downward from the main body.

Yet another object of the present invention is to concavely provide a groove at the engaging segment protruded from the moving element corresponding to the connecting element, so as to pass through the through hole of the connecting element with good flexibility.

DETAILED DESCRIPTION OF THE EMBODIMENTS

Figure 1:
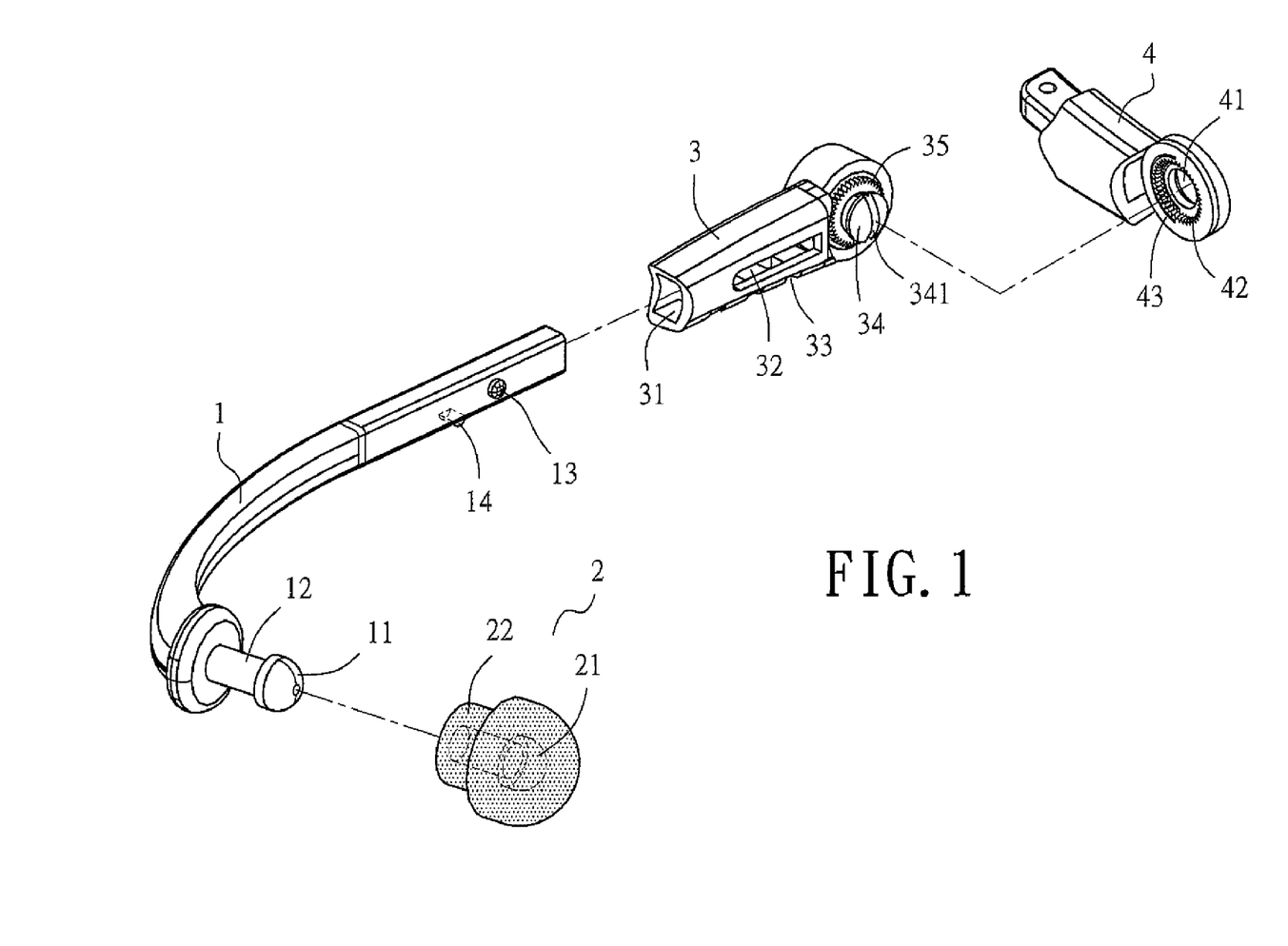
FIG. 1 is an exploded perspective view of an eyeglass temple assembly in accordance with the present invention.

Refer to FIG. 1, which illustrates an eyeglass temple assembly 5 of the present invention, comprising a main body 1, a foam earplug 2, a moving element 3, and a connecting element.

The main body 1 is provided at a rear section of the eyeglass temple assembly 5. A supporting segment 11 extends from one end of the main body 1 so as to engage with the foam earplug 2. A waist portion 12 is formed in a middle section of the supporting segment 11. The other end of the main body 1 is formed with a protrusion 13 at one side, and a boundary portion 14 extending from a bottom surface.

The foam earplug 2 is made of soft material so as to block external noise. In one embodiment, the earplug portion is formed into a half-ball shape. One end of the form earplug 2 is provided with a hole 21 to correspond to the supporting segment 11 of the main body 1, and a narrow restricting segment 22 is formed at an outer side of the hole 21.

The moving element 3 is rotatable with one end of the main body 1 and the connecting element 4. One end of the moving element 3 is provided with a through hole 31 dependent upon a configuration of the main body 1. The moving element 3 is further provided with a lateral groove 32 at one side and a plurality of slots 33 disposed with intervals on the bottom. Additionally, a working end of the moving element 3 is provided with an annual toothed portion 35 having an engagement segment 34 therein. A groove 341 is provided within the engagement segment 34.

The connecting element 4 is to be connected to an eyeglass frame with functional lenses. A working end of the connecting element 4 is provided with an annual toothed plate 42 with a through hole 41. The through hole 41 corresponds to the engagement segment 34 of the moving element 3, while the annual toothed plate 42 is formed corresponding to the annual toothed plate 35 of the moving element 3. Additionally, at least one curved groove 43 is provided along a perimeter between the through hole 41 and the annual toothed plate 42.

Figure 2:
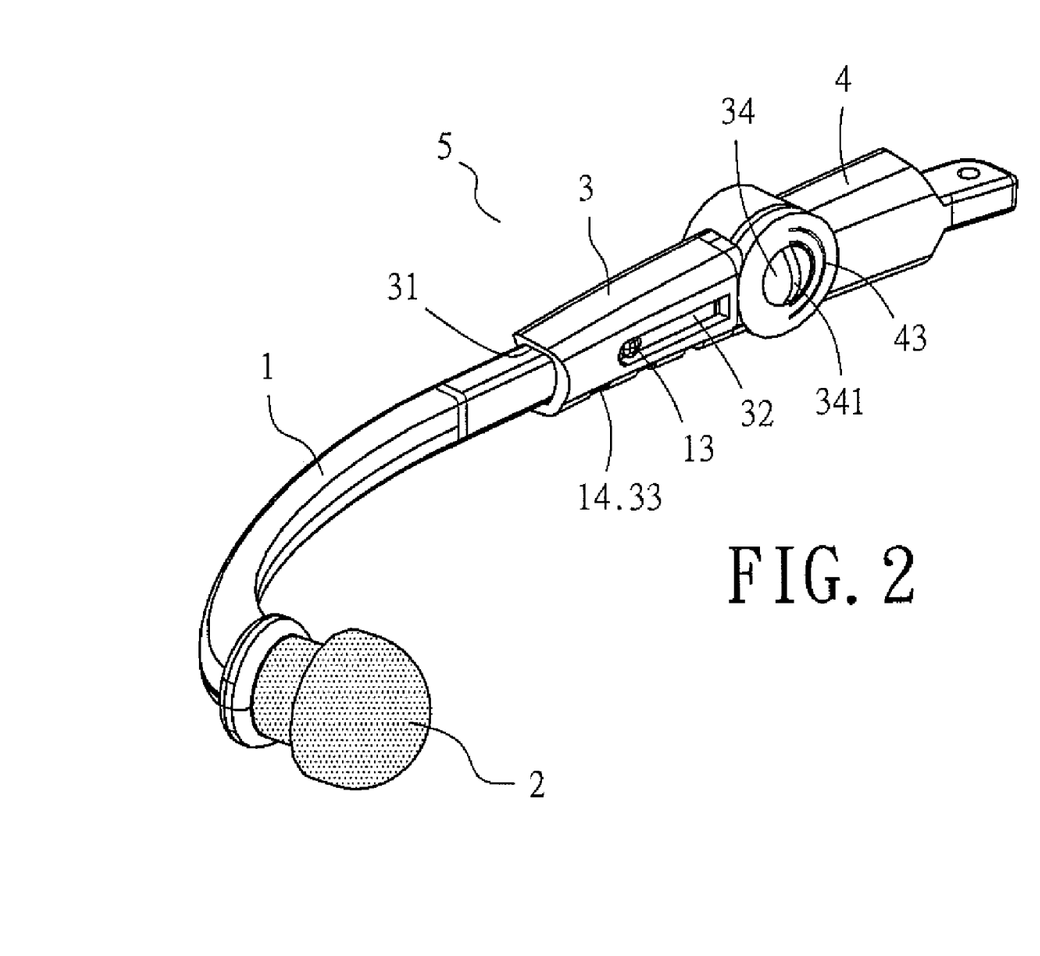
FIG. 2 shows the eyeglass temple assembly in accordance with the present invention.
Figure 4:
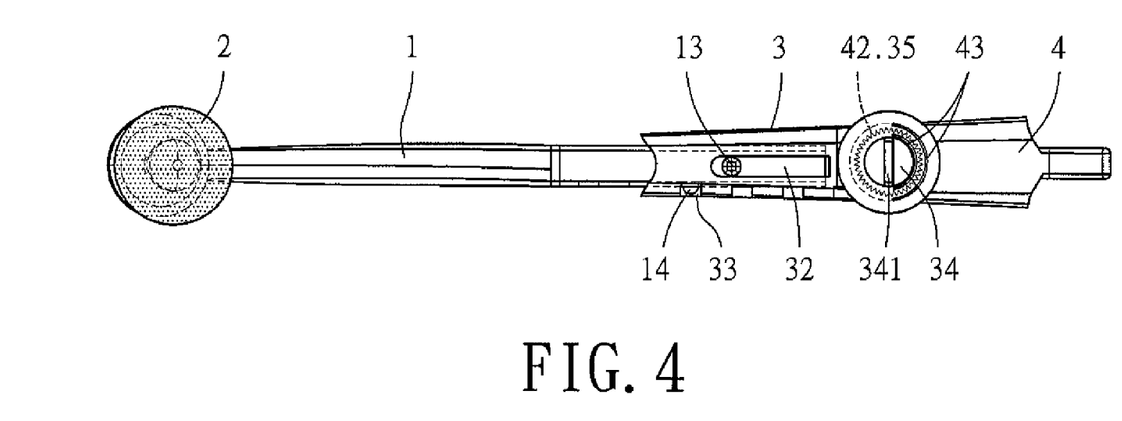
FIG. 4 is a side view of the eyeglass temple assembly in accordance with the present invention.

Refer to FIGS. 1, 2 and 4, which illustrate an assembly embodiment of the main body 1, the foam earplug 2, the moving element 3 and the connecting element 4. The supporting segment 11 at one end of the main body 1 is correspondingly inserted into the hole 21 of the foam earplug 2. The waist portion 12 of the supporting segment 11 is contained in the restricting segment 22 outside the hole 21. The other end of the main body 1 is inserted into the through hole 31 of the moving element 3. As a result, the lateral groove 32 opened at one side of the moving element 3 is allowed to engage with the corresponding protrusion 13 of the main body 1 for positional guidance, as shown in FIG. 2. The plurality of slots 33 on the bottom of the moving element 3 matches with the boundary portion 14 of the main body 1 for positional restriction, as shown in FIG. 4. Then, the annual toothed portion 35 at the engagement segment 34 protruded from the working end of the moving element 3 is used to correspondingly engage with the annual toothed plate 42 with through hole 41 of the connecting element 4, as shown in FIG. 4. The engagement segment 34 with the groove 341 of the moving element 3 can pass through the through hole 41 of the connecting element 4. The curved groove 43 provided along the perimeter between the through hole 41 and the connecting element 4 allows the engagement segment 34 of the moving element 3 to pass through the through hole 41 of the connecting element 4 with well flexible support. As a result, the eyeglass temple assembly 5 with earplugs and adjustable eyeglass temples is achieved.

Figure 3:
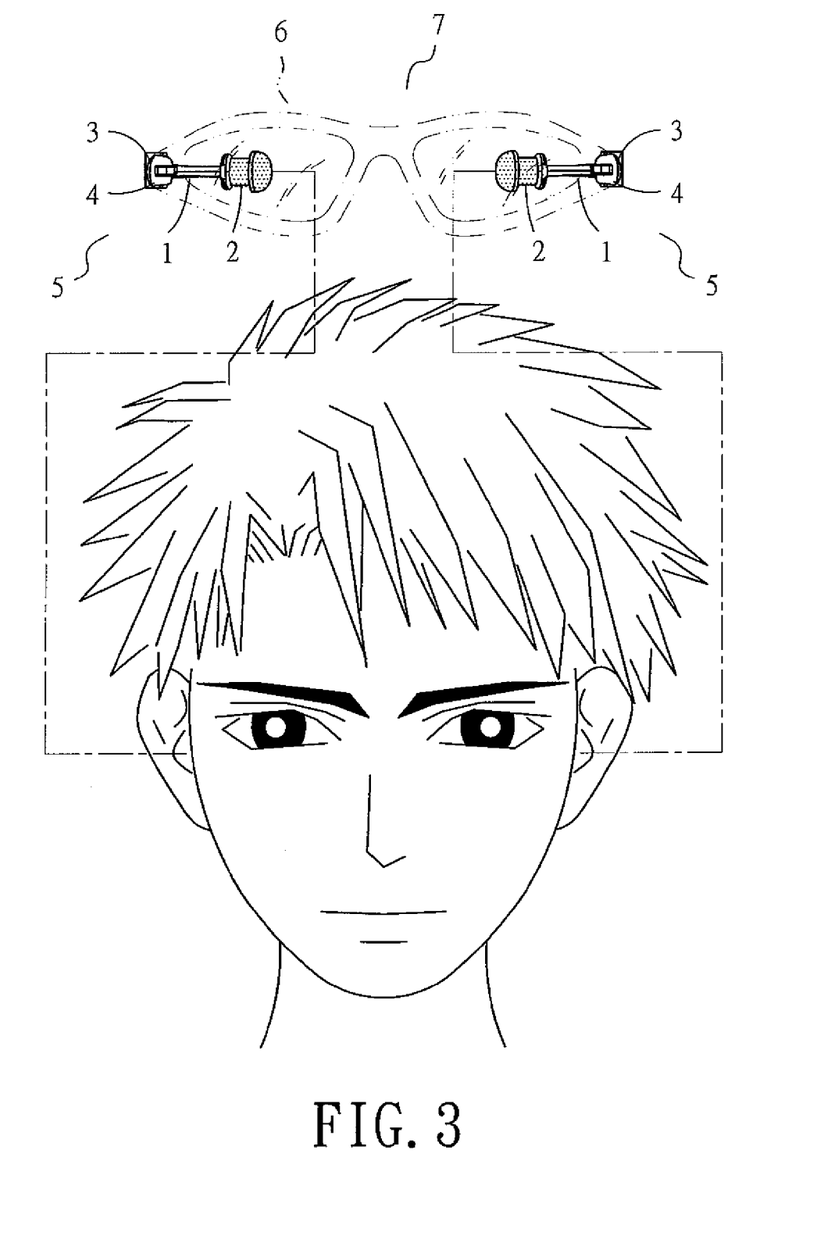
FIG. 3 is a schematic view of an embodiment when the eyeglass temple assembly in accordance with the present invention connected with eyeglasses is worn.

As shown in FIG. 3, to assemble eyeglasses 7, such as goggles used for welding and eye protection purpose, a pair of the eyeglass temple assemblies 5 is connected to a frame 6 with functional lenses. The respective foam earplugs 2 at ends of the eyeglass temple assemblies 5 are directly inserted into a user's ears, and the frame 6 is placed at a bridge of a nose. Therefore, double protection on ears and eyes of the user is provided.

Figure 5:
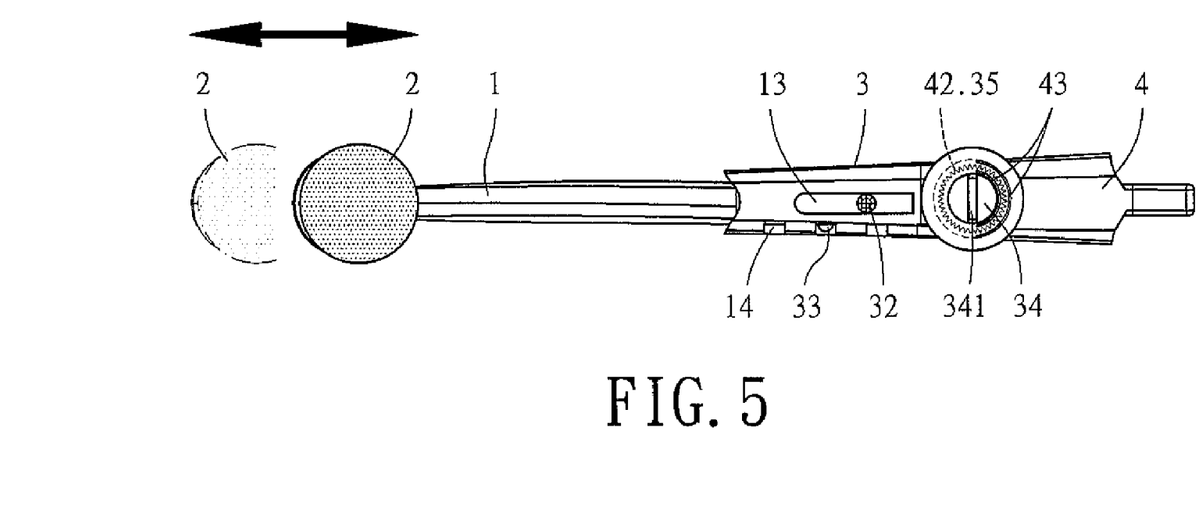
FIG. 5 is a schematic view of an embodiment showing the flexibility of the eyeglass temple assembly in accordance with the present invention.

The eyeglass temple assemblies 5 connected to two sides of the eyeglasses for eyes and ears protection may be flexibly adjusted in accordance with the user's head, as shown in FIG. 5. When the eyeglasses need to be widened, the user can push the boundary portion 14 engaged within the slots 33 on each moving element 3 inward such that the main body 1 is moved backward. When the eyeglasses are adjusted to the correct position, the boundary portion 14 is once again engaged with the corresponding slot 33 to form a positional restriction.

Figure 6:
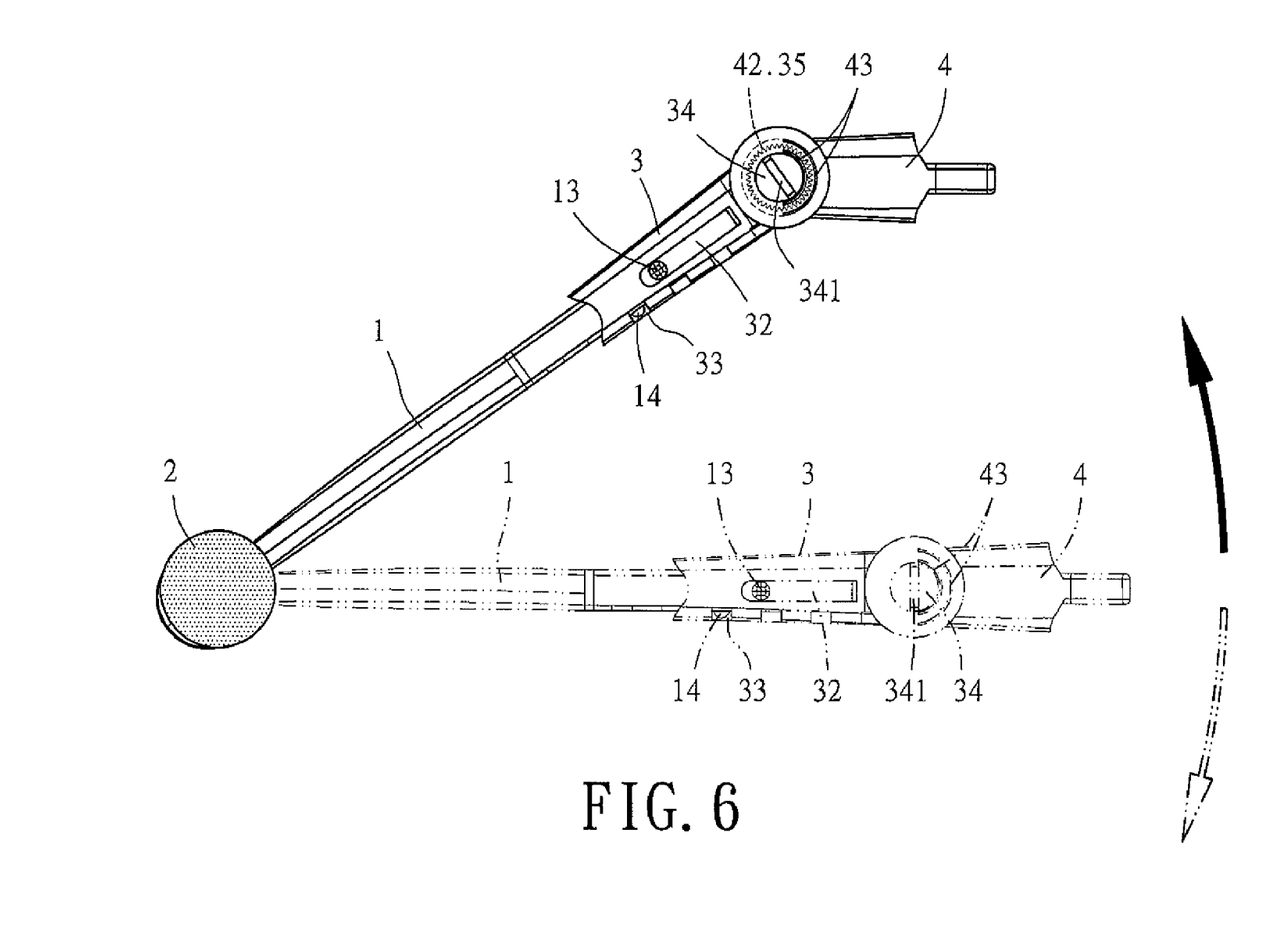
FIG. 6 is a schematic view of an embodiment showing the angular adjustment of the eyeglass temple assembly in accordance with the present invention.
Figure 7A:
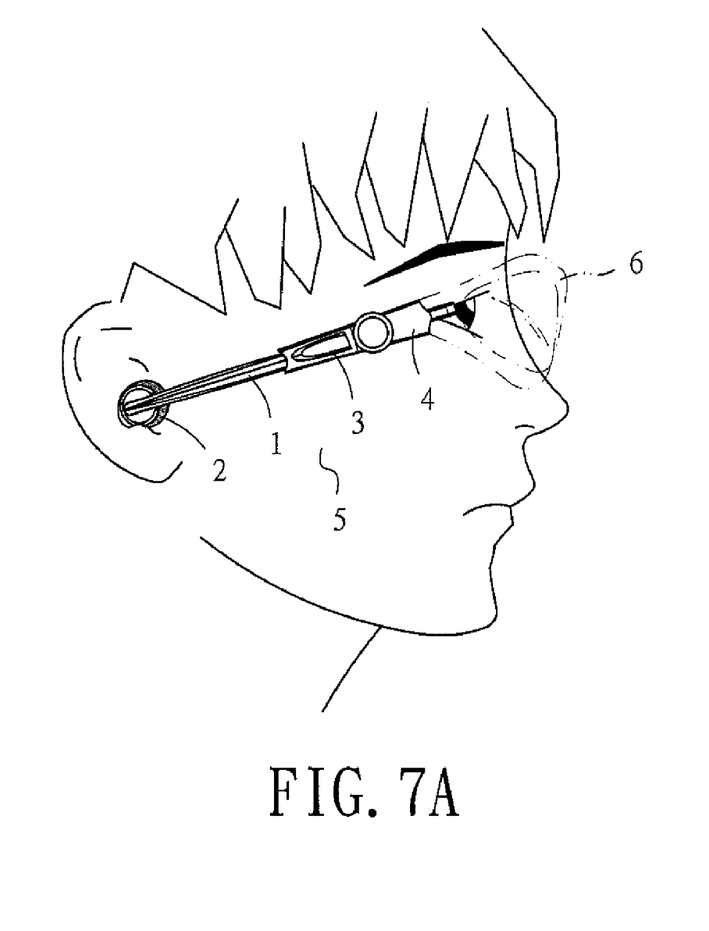
FIGS. 7A, 7B, and 7C illustrate a schematic view of a second embodiment showing the angular adjustment of the eyeglass temple assembly in accordance with the present invention.
Figure 7B:
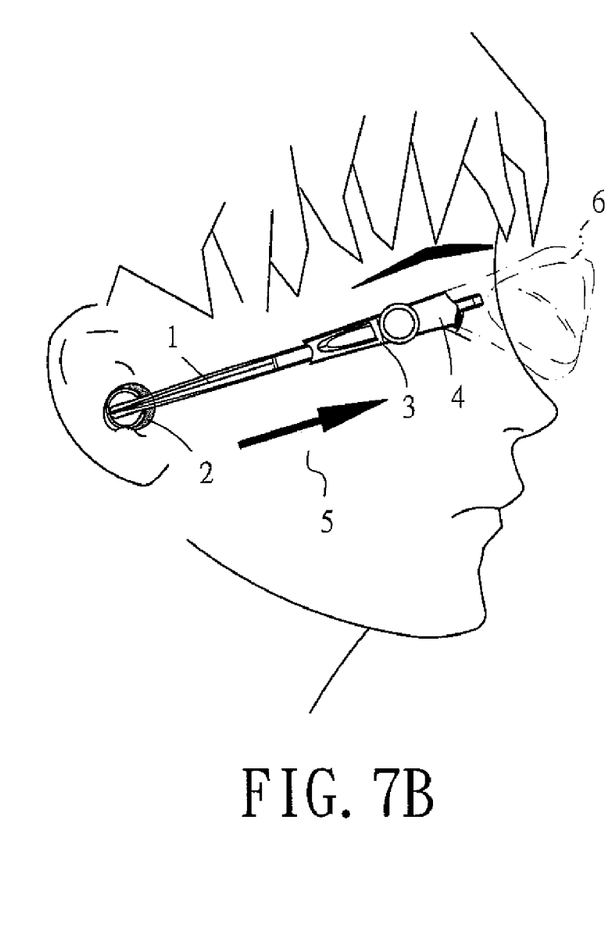
Figure 7C:
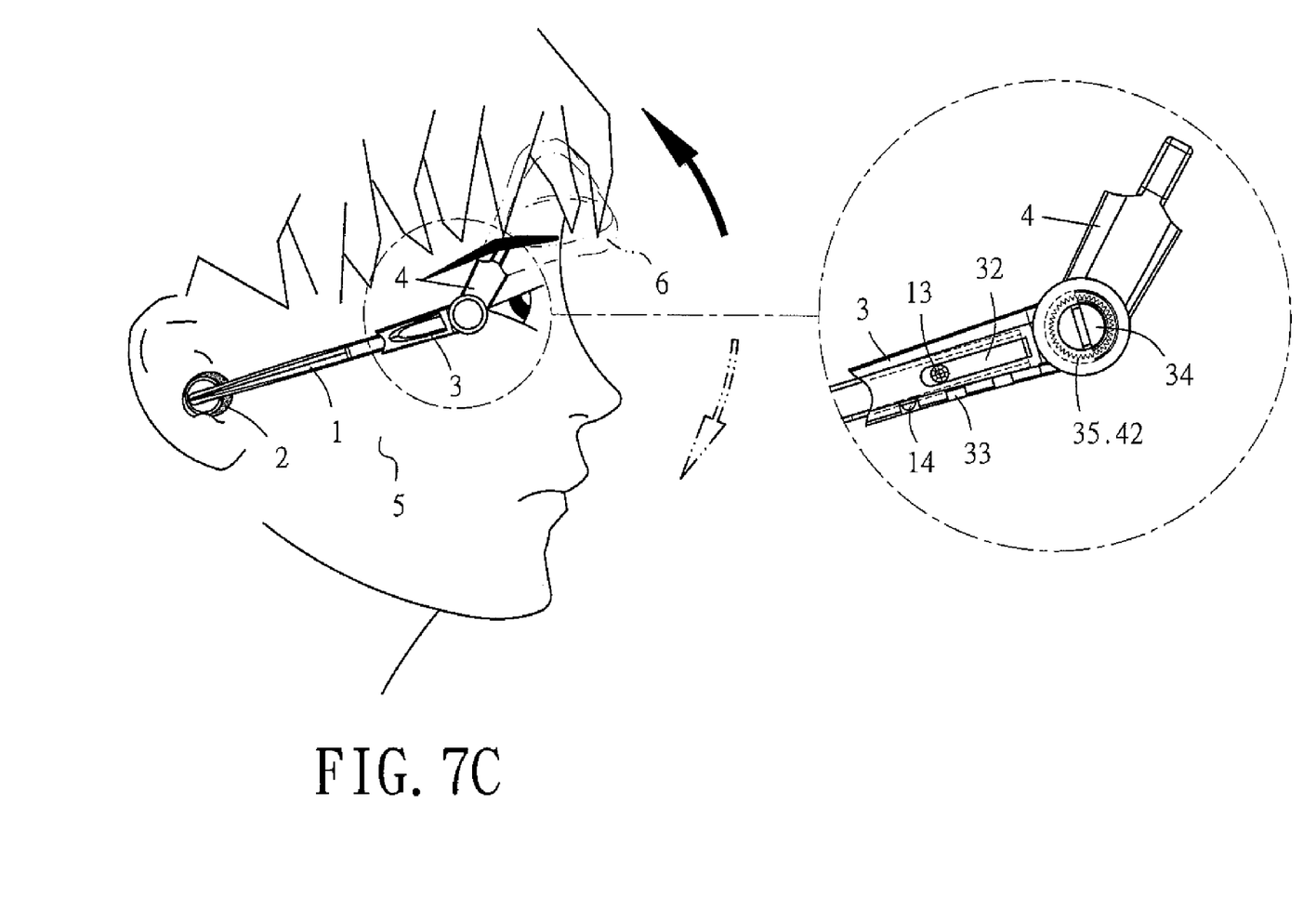

Additionally, to move the eyeglass temple assembly 5 at two sides of the eyeglasses up and down, as shown in FIG. 6, the connecting element 4 pivotally connected at one end of the moving element 3 is moved upward along with the eyeglasses connected thereto, such that the annual toothed plate 42 within the connecting element 4 can be angularly adjusted according to the annual toothed portion 35 of the moving element 3. When the angular adjustment is complete, the connecting element 4 connected to the eyeglasses and the adjacent moving element 3 can be positioned angularly through the engagement of the annual teeth. Alternatively, the moving element 3 of the eyeglass temple assembly 5 can be pulled outward first, as shown in FIGS. 7A and 7B, and then the annual toothed plate 42 of the connecting element 4 and the annual toothed portion 35 of the moving element 3 are moved at the same angle accordingly, as shown in FIG. 7C, to move the eyeglasses upward. As a result, the user may easily operate the eyeglasses to move up and down while stably positioning the eyeglasses as needed.

Figure 8:
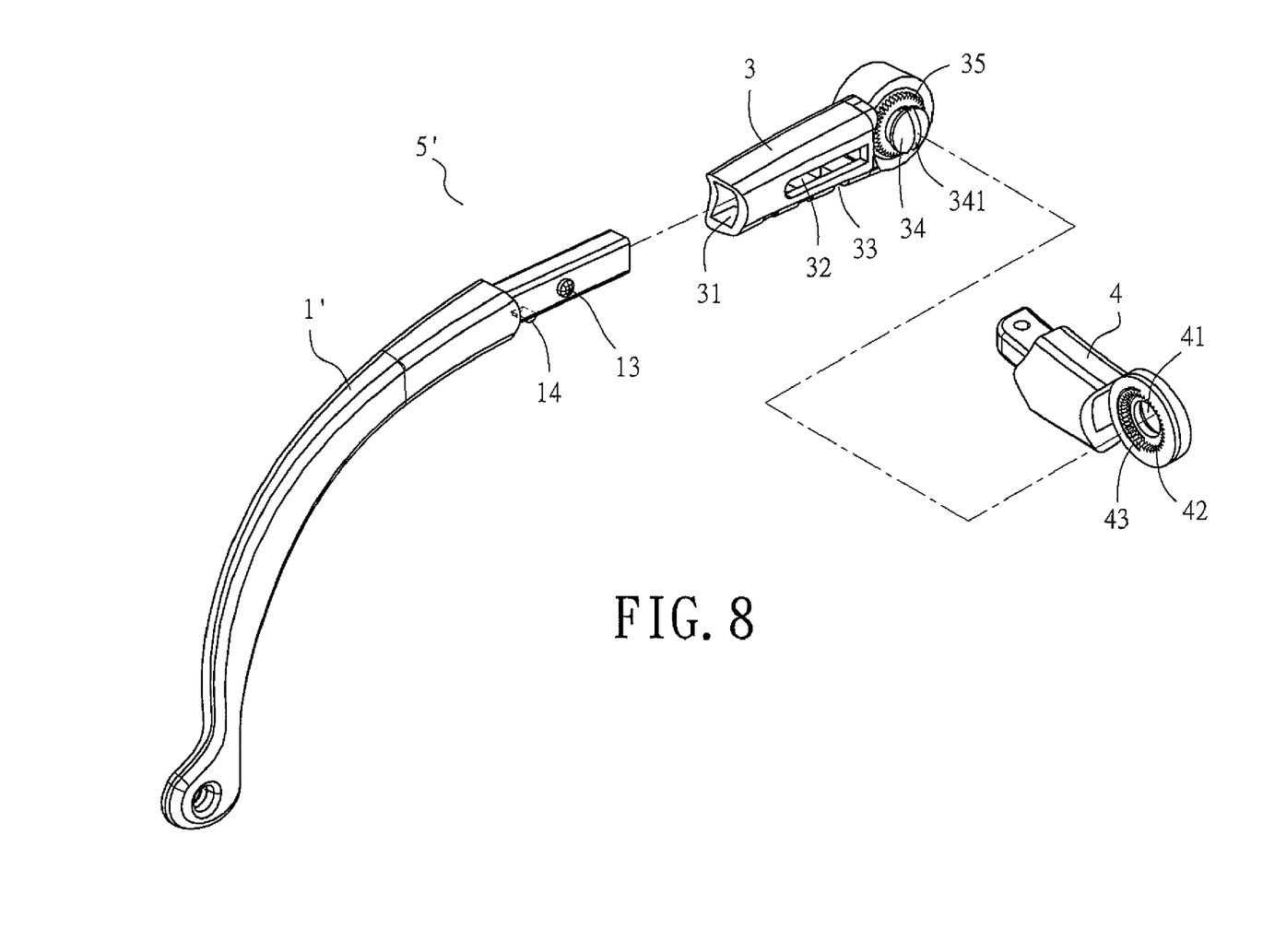
FIG. 8 is an exploded perspective view of another embodiment of the eyeglass temple assembly in accordance with the present invention.

Refer to FIG. 8, which illustrates an alternative embodiment of the eyeglass temple assembly in accordance with the present invention. The assembly includes a main body 1', the moving element 3 and the connecting element 4 to form an eyeglass temple assembly 5'. The structure of the moving element 3 and the connecting element 4 is similar to that in the first embodiment mentioned previously. The difference in the eyeglass temple assembly 5' is that one end of the main body 1' is provided with the protrusion 13 and the boundary portion 14 extending downward, and the other end of the main body 1' is in the form of conventional eyeglass temple, such that a working end of the main body 1' can be engaged with the moving element 3. One end of the moving element 3 is pivotally connected to the connecting element 4 connected with a frame with functional lenses, when engaged as mentioned before, the eyeglass temple assembly 5' connected to the frame may be worn as in the conventional art.

What is claimed is:

1. An eyeglass temple assembly, comprising a main body, a moving element having one end being connected to an inner end of the main body and another end being provided with an annual toothed portion having an engaging segment therein, a connecting element having one end to be connected to an eyeglass frame and another end provided with an annual toothed plate with a through hole so as to correspondingly and pivotally connect to the moving element, and at least one curved groove provided along a perimeter between the through hole and the annual toothed plate on the connecting element so as to provide flexibility for the engaging segment of the moving element to pass through the through hole of the connecting element; whereby the eyeglass temple assembly can be used in combination with eyeglasses provided with functional lenses so as to facilitate position adjustment of the eyeglasses as needed by moving the eyeglasses up and down.

2. The eyeglass temple assembly of claim 1, wherein an outer end of said main body is combined with a foam earplug so as to provide a user with double protection for ears and eyes.

3. The eyeglass temple assembly of claim 1, wherein the moving element comprises a lateral groove at one side so as to provide a positional guidance of a protrusion formed on a corresponding side at an inner end of said main body, and a plurality of slots formed on the bottom with intervals so as to provide a positional restriction for a boundary portion extending downward from said main body.

4. The eyeglass temple assembly of claim 3, wherein an outer end of said main body, which has the protrusion on the inner end and the boundary portion extending downward, is formed into an eyeglass temple such that when being connected with the eyeglass frame, said eyeglass temple assembly is worn as in the conventional art.

5. The eyeglass temple assembly of claim 1, wherein a groove is concavely provided at said engagement segment protruded from said moving element corresponding to said connecting element so as to provide a good flexibility when passing through said through hole of said connecting element.

6. The eyeglass temple assembly of claim 1 or 2, wherein the outer end of said main body is formed with a supporting segment with a waist portion to be inserted into a hole of said foam earplug, and said waist portion of said main body is contained in a restricting segment outside said foam earplug.

* * * * *